Patented Apr. 22, 1952

2,593,444

UNITED STATES PATENT OFFICE 2,593,444

FATTY ACRYLATE-STYRENE COPOLYMERS

Stuart A. Harrison, Minneapolis, Minn., assignor to General Mills, Inc., a corporation of Delaware No Drawing. Application February 18, 1950, Serial No. 145,093

6 Claims. (Cl. 260—86.7)

The present invention relates to copolymers of fatty acrylates and methacrylates with styrene, and more particularly relates to copolymers of styrene with acrylates and methacrylates in which the acrylates and methacrylates are esterified with higher unsaturated fatty alcohols derived from unsaturated higher fatty acids.

In general polymers and copolymers of fatty acid derivatives have not been promising as materials for protective coatings. Furthermore, certain difficulties have been attendant the preparation of such products. For example, when one attempts to copolymerize vinyl or allyl esters of unsaturated fatty acids with styrene using peroxide as catalyst, reaction is not complete. The styrene polymerizes or copolymerizes almost completely, but only part of the vinyl or allyl ester is converted to the polymer or copolymer. In order to isolate the polymeric material, therefore, it is necessary to vacuum distill the unpolymerized esters from the polymer. Moreover, the polymeric material which is obtained as a residue contains a very large proportion of polymerized styrene and, as a result, the material produces a rather brittle film and one which is not particularly resistant to water or alkali.

It has been discovered, however, that the esters of acrylic acid and methacrylic acid produced from higher unsaturated fatty alcohols derived from higher unsaturated fatty acids, may be copolymerized with styrene very readily by means of the usual peroxide catalysts and the copolymerization proceeds very rapidly and to substantial completion such that it is not necessary to remove any monomeric material to produce a satisfactory coating material.

It is therefore an object of the present invention to provide novel copolymers of styrene with higher unsaturated fatty alcohol esters of acrylic acid and methacrylic acid.

It is a further object of the present invention to provide a novel process for the preparation of such copolymers.

The invention is applicable to higher unsaturated fatty alcohols containing from 8 to 22 or more carbon atoms. These may conveniently be obtained by the sodium reduction of the methyl esters of the corresponding fatty acids by the method of Hansley—Ind. & Eng. Chem. 39, 55 (1947). The alcohols thus obtained may be converted to the acrylate or methacrylate esters by ester interchange with methyl methacrylate or methyl acrylate.

The copolymers may be formed by heating a solution of the acrylate or methacrylate ester with styrene in a suitable solvent such as mineral spirits in the presence of a peroxide catalyst such as benzoyl peroxide. The polymerization may be carried out at elevated temperatures, for example, 80° C., for extended periods of time, twenty-four hours or more, and in the presence of an inert gas such as nitrogen to prevent oxidation.

The invention is applicable to acrylate and methacrylate esters of fatty alcohols derived by the reduction of unsaturated fatty acids. The unsaturated fatty acids may be the mixed acids of a drying or semi-drying oil such as soybean oil, linseed oil, oiticica oil, tung oil, perilla oil, and the like. The fatty acids may likewise be any selected fraction of the mixed acids of such oils. Furthermore, if desired, the fatty acids may be an isolated unsaturated fatty acid having from 8 to 22 carbon atoms. There also may be used the fatty acid fraction of tall oil.

The acrylate and methacrylate esters may be used in the styrene copolymer in proportions ranging from 20% to 50% of acrylate or methacrylate ester to 50% to 80% of the styrene. Usually it is not desirable to employ higher proportions of the acrylate ester than 50% since the films produced tend to become softer than is usually desired. Likewise it is usually not desirable to employ less than 20% of the acrylate or methacrylate ester since the composition would then contain such a high proportion of high styrene copolymers as to produce a very brittle film. Within the range of from 20–50% acrylate and methacrylate esters and from 50–80% styrene the copolymers in general produce hard films with sufficient plasticity to prevent the films from being brittle.

The following examples will serve to illustrate the invention:

EXAMPLE 1

Equal weights of tall oil and absolue methanol containing 3% sulfuric acid were refluxed for one to two hours. The excess methanol was then distilled off and the sulfuric acid separated in a separatory funnel. Enough sodium hydroxide to neutralize all of the rosin acids, plus a 10% excess, was dissolved in twenty times its weight of water. To this was added one-half as much methanol by volume. The alkali was then added to the esterification mixture and the oil which separated was removed. The water layer was extracted twice with hexane and the combined oil and hexane extractions washed with water until neutral. The hexane was removed and the product vacuum distilled.

The methyl esters of the fatty acid fraction of tall oil, produced as above described, were then reduced to alcohols by sodium reduction according to the following method: The reduction was carried out in a 5-liter, 3-necked flask equipped with air driven stirrer, reflux condenser, heating mantle, thermometer, and dropping funnel. Sodium (174 g.) was heated above its melting point in 50 cc. xylene and broken into small spheres by rapid stirring. A solution of 500 g. of the methyl esters in 400 g. of methyl isobutyl carbinol and 1200 g. of xylene was added slowly to the violently stirred mixture. The temperature was maintained between 130–140° C. during the reaction and additional xylene added from time to time to keep the mass fluid. After all of the solution was added, the mixture was stirred for another hour while maintaining the temperature by heating. The excess sodium was decomposed with ethyl alcohol. The product was put into water, then acidified with dilute sulfuric acid. The oil layer was washed with water until free of acid. The solvent was distilled off and the product vacuum distilled through a 14-inch Vigreaux column. The main fraction of tall oil fatty alcohol weighed 284 g. and boiled from 125–128° C. at 0.1 mm. This material had an acid number of 0.4, a hydroxyl number of 191.7, and an iodine value of 130.1.

The alcohols were converted to the acrylates by ester interchange with methyl acrylate. The following materials were placed in a 2-liter, 3-necked flask equipped with stirrer, heating mantle and 5-inch Vigreaux column holding an alembic head:

| | Grams |
|---|---|
| Tall oil fatty alcohols | 280 |
| Methyl acrylate | 400 |
| Hydroquinone | 7 |
| p-Toluene sulfuric acid | 7 |

The mixture was stirred and refluxed until the temperature in the head dropped to 70° C. A mixture of methyl alcohol and methyl acrylate was slowly removed until substantially all of the alcohol had been eliminated. The product was washed free of acid with water, dried, and vacuum distilled without a column. The main fraction boiling from 147–152° C. at 0.15 mm. was taken. It had a hydroxyl value of 2.4, an iodine value of 114, and a saponification number of 171.5.

The tall oil fatty acrylate was copolymerized with styrene in the following manner: Thirty parts of acrylate, 70 parts of styrene, 0.75 parts of benzoyl peroxide were put into solution in 100 parts of mineral spirits. The solution was put into a small mouthed screw cap bottle, the air above the solution displaced by nitrogen, the bottle sealed and heated to 80° C. for 28 hours without agitation.

The resulting polymer solution was clear and viscous. Films were cast after adding the following driers: lead, 0.1%; cobalt, 0.004%; and manganese, 0.004%, in the form of the octoates. The films air dried tack free in one hour. The Sward Rocker hardness on the dried films was as follows:

| Drying Time | 30 min. | 24 hrs. | 48 hrs. | 72 hrs. | 96 hrs. |
|---|---|---|---|---|---|
| Drying Temp | 130° C. | R. T. | R. T. | R. T. | R. T. |
| Hardness Rating | 46 | 26 | 32 | 31 | 34 |

Immersion in 5% NaOH at room temperature for 24 hours did not affect the film. Immersion in boiling water for two hours whitened it and expanded it slightly. It recovered in 10 minutes after removal. Immersion in cold water for 72 hours caused a haze which did not disappear from the film in two hours. The film did not appear to be affected appreciably in other ways. Addition of 25% of the rosin ester of 2,2,6,6-tetramethylolcyclohexanol eliminated the hazing tendency. The film had good flexibility, showing no sign of failure when a coated tin strip was bent over a ⅛" mandrel.

EXAMPLE 2

The methacrylate esters of the mixed soybean oil acids were prepared by the procedure given above for the preparation of the acrylate esters. The product obtained had an $n_D^{30}$ 1.4605, a boiling range of 160–167° C. at 0.05 mm.

Styrene copolymers of the acrylates derived from the tall oil fatty alcohols of Example 1 and the soybean oil alcohol methacrylate esters of Example 2 were prepared according to the process described in Example 1. In these copolymers the proportions were used as indicated in the following table:

| Bottle | Tall Oil Acrylate | Soybean Methacrylate | Benzoyl Peroxide | Styrene | Mineral Spirits |
|---|---|---|---|---|---|
| | G. | G. | G. | G. | Cc. |
| A | 1.0 | | 0.05 | 9.0 | 10 |
| B | 1.5 | | 0.05 | 8.5 | 10 |
| C | 2.0 | | 0.05 | 8.0 | 10 |
| D | | 3.0 | 0.05 | 7.0 | 10 |

After polymerizing for 25 hours, an additional 0.025 g. of benzoyl peroxide was added to each and polymerization was continued for 32 hours more. At the end, A was white and opaque, B was slightly cloudy and C and D were clear, viscous solutions.

To solutions B, C and D 0.1% Pb, 0.004% cobalt and 0.004% Mn-octoate driers were added and films cast.

*Film drying rate*

| Film | No Transfer | Dried Thru | Tack Free to Foil |
|---|---|---|---|
| | Min. | Min. | |
| B | 2 | 15 | 40 min. |
| C | 5 | 15 | 1 hr. |
| D | 8 | 20 | 1 hr. |

Film properties:
 Boiling water.—All films whitened after a few minutes in boiling water. After two hours B and C did not recover, D recovered partially.
 5% alkali.—All withstood 5% alkali for 24 hours.
 Water at room temp.—After 96 hours in water at room temperature B, C, D whitened, B worst, D least; D recovered completely in 2 hours, C nearly completely and B partially.
Film hardness:
 After 72 hours, B—32, C—30, and D—40 by the Sward Rocker test.

The films produced from samples A and B were excessively brittle and readily cracked. The films produced from samples C and D were of acceptable flexibility and resisted cracking on bending.

I claim as my invention:

1. A liquid, soluble copolymer of styrene and a higher unsaturated fatty alcohol ester of an acid selected from the group consisting of acrylic acid and methacrylic acid, the fatty alcohol containing from 8 to 22 carbon atoms and being derived from the mixed fatty acids of an oil selected from the group consisting of drying and semi-drying oils, the copolymer being comprised of from 50–80% styrene and from 20–50% of said ester.

2. A liquid, soluble copolymer of styrene and a higher unsaturated fatty alcohol ester of acrylic acid, the fatty alcohol containing from 8 to 22 carbon atoms and being derived from the mixed fatty acids of an oil selected from the group consisting of drying and semi-drying oils, the copolymer being comprised of from 50–80% styrene and from 20–50% of said ester.

3. A liquid, soluble copolymer of styrene and a higher unsaturated fatty alcohol ester of methacrylic acid, the fatty alcohol containing from 8 to 22 carbon atoms and being derived from the mixed fatty acids of an oil selected from the group consisting of drying and semi-drying oils, the copolymer being comprised of from 50–80% styrene and from 20–50% of said ester.

4. A liquid, soluble copolymer containing from 50–80% styrene and from 20–50% of a higher unsaturated fatty alcohol ester of acrylic acid, the higher unsaturated fatty alcohol being derived from the mixed acids of soybean oil.

5. A liquid, soluble copolymer containing from 50–80% styrene and from 20–50% of a higher unsaturated fatty alcohol ester of methacrylic acid, the higher unsaturated fatty alcohol being derived from the mixed acids of soybean oil.

6. A liquid, soluble copolymer containing from 50–80% styrene and from 20–50% of a higher unsaturated fatty alcohol ester of methacrylic acid, the higher unsaturated fatty alcohol being derived from tall oil fatty acids.

STUART A. HARRISON.

REFERENCES CITED

The following references are of record in the file of this patent:

UNITED STATES PATENTS

| Number | Name | Date |
|---|---|---|
| 2,129,662 | Barrett et al. | Sept. 13, 1938 |
| 2,129,665 | Barrett et al. | Sept. 13, 1938 |
| 2,187,694 | Slagh | Jan. 16, 1940 |
| 2,273,891 | Pollack et al. | Feb. 24, 1942 |